Aug. 1, 1967  TOSHIO DOI  3,333,462
STRAIN GAUGES
Filed May 4, 1964
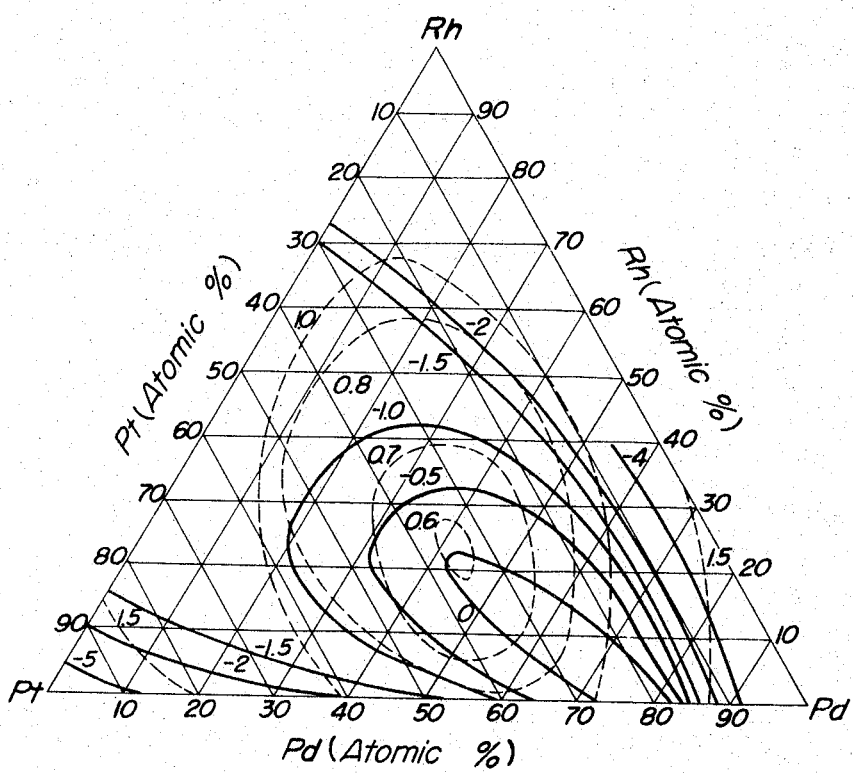
INVENTOR
TOSHIO DOI
BY Paul M. Craig, Jr.
ATTORNEYS

3,333,462
STRAIN GAUGES
Toshio Doi, Tokyo, Japan, assignor to Hitachi, Ltd., Chiyoda-ku, Tokyo, Japan, a corporation of Japan
Filed May 4, 1964, Ser. No. 364,531
Claims priority, application Japan, May 15, 1963, 38/24,160
6 Claims. (Cl. 73—88.5)

This invention relates to strain gauges comprised of a material including at least two elements selected from the group consisting of platinum, palladium and rhodium and has for its object to provide a strain gauge having improved characteristics including an increased gauge factor and which can be manufactured with a minimum of variation in such characteristics.

Strain gauges, which utilize change in electrical resistance of the gauge filament when strained are not only widely used in different strain measurements, but recently are also made use of as a transducer element of various types of industrial measuring instruments including self-balanced recorders for converting a mechanical motion into an electrical signal.

Generally, the strain gauge includes a grid formation of metallic filament or foil to utilize its change in electrical resistance when cemented to the object to be measured and strained. The sensitivity of such strain gauge is represented by its gauge factor, GF, which is expressed by the formula:

$$GF = (1+2\nu) + \frac{\frac{\Delta \rho}{\rho}}{\frac{\Delta l}{l}}$$

where $\nu$ represents the Poisson's ratio of the filament material, $\rho$ represents its electrical resistivity and $l$ the length of the gauge filament. The Poisson's ratio is approximately 0.3 with all metals and, therefore, it is necessary to increase $$\frac{\Delta \rho}{\rho} \bigg/ \frac{\Delta l}{l}$$

in order to increase the GF.

Thus, strain gauges are required for purposes of efficiency to have a high gauge practically free from temperature change, a high linearity, a high electrical resistivity, a low temperature coefficient of resistance and a high proportional limit. Further requirements include a high homogeneity, a limited secular change, a limited hysteresis and a limited thermal electromotive force when used with copper on a D.C. power supply. The gauge material should also have a high workability so that it may be worked into fine filament with ease. Additional requirements include excellent mechanical properties, a high solderability, and a substantial resistance to oxidation and corrosion.

The Table 1 gives some measured values of gauge factor, temperature-coefficient of resistance and electrical resistivity of gauge materials previously in use.

| Material | Gauge factor, GF | Temperature, coefficient of resistance, $C_f (\times 10^{-6}/°C.)$ | Electrical resistivity, $\rho$ ($\mu\Omega$-cm.) |
|---|---|---|---|
| Cu-Ni | 2.12<br>2.1<br>2.12<br>2.05<br>2.04 | ±20 | 43~49 |
| Iso Elastic | 3.56<br>3.53<br>3.6<br>3.6 | 470 | 80 |
| Ni-Cr | 2.55<br>2.1<br>2.63 | ±20 | 100~140 |
| Manganine | 0.47<br>0.5<br>0.47 | ±20 | 40~45 |
| Monel | 1.9 | 2,000 | 48 |
| Pt | 4.12 | 3,000 | 25 |

Of the gauge materials listed, Cu-Ni alloys are used most commonly and have a considerably small temperature coefficient of resistance and a high electrical resistivity, as listed in Table 1, but their gauge factors are of the order of 2. Gauges formed of Cu-Ni alloys generally have a variation in quality or performance of as wide as 5 to 10% within the same lot or between lots of the gauge material. A further deficiency of such strain gauges lies in the limited resistance to oxidation and corrosion due to the fact that the alloy used includes base metals as its elements. Even those alloys containing noble metals have given only unsatisfactory results, as listed in the table.

To overcome these difficulties, the present invention proposes to employ as a gauge material a binary alloy of platinum with palladium or rhodium or a ternary alloy of platinum with palladium and rhodium to provide an improved strain gauge which has a gauge factor of 4 or over, a relatively low temperature coefficient of resistance, a relatively high electrical resistivity and other characteristics exceeding those of conventional strain gauges, and also has a very limited range of variation in quality and performance.

Some practical examples of the present invention will now be illustrated. Table 2 includes some measured values of tensile strength, electrical resistivity and gauge factor of the inventive gauge alloys.

TABLE 2

| Composition (Atomic percent) | | | Tensile strength, kg./mm.² | Electrical resistivity, ($\mu\Omega$-cm.) | Gauge factor |
|---|---|---|---|---|---|
| Pt | Rh | Pd | | | |
| 55.0 | 45.0 | 0 | 163.0 | 19.1 | 4.0 |
| 45.0 | 0 | 55.0 | 54.0 | 27.7 | 4.3 |
| 52.2 | 33.5 | 14.3 | 104.0 | 25.4 | 4.1 |
| 50.0 | 22.5 | 27.5 | 85.8 | 27.4 | 4.3 |
| 47.5 | 11.3 | 41.2 | 62.4 | 29.6 | 4.2 |
| 38.0 | 20.0 | 42.0 | 80.5 | 30.1 | 4.3 |
| 20.0 | 30.0 | 50.0 | 72.6 | 28.5 | 4.3 |
| 20.0 | 70.0 | 10.0 | 40.0 | 14.6 | 4.0 |
| 80.0 | 10.0 | 10.0 | 55.0 | 17.5 | 4.2 |
| 10.0 | 10.0 | 80.8 | 63.0 | 14.6 | 4.1 |

As noted in the above table, the alloys listed all have a gauge factor of 4 or over and a considerable tensile strength of approximately 50 to 160 kg./mm.². In addition, they have been found to have a good workability to be worked into fine filament with ease. Their electrical resistivity of a value of from approximately 20 to 30 $\mu\Omega$-cm. is a little lower than that of Cu-Ni alloys, but this drawback can readily be overcome by reducing the filament diameter. As can be readily seen by referring to Table 2, although the present invention is directed to both a binary and ternary system, the ternary alloys having a composition of about 20.0–52.2 atomic percent platinum, about 11.3–33.5 atomic percent rhodium, and about 14.3–50.0 atomic percent palladium show the most advantageous results of both tensile strength and electrical resistivity and thus are a preferred embodiment of the present invention.

Next, the relationship of the inventive alloy with respect to its thermal electromotive force relative to copper and temperature coefficient of resistance will be described with reference to the accompanying drawing, which represents a ternary diagram of the Pt-Rh-Pd alloy. In the diagram, the solid lines indicate the values of thermal electromotive force of the alloy relative to copper in $\mu v./° C.$, and the dotted lines the values of temperature coefficient of resistance $C_f$, in $10^{-3}/° C.$ As observed in this diagram, the ternary system has a composition range in which the thermal electromotive force is reduced to zero, and also a region where the alloy has a temperature coefficient of resistance of $0.6 \times 10^{-}/° C.$ or less. Also, there is a considerably large composition region where the alloy exhibits a thermal electromotive force of $\pm 2$ $\mu v./° C.$ relative to Cu and a temperature coefficient of resistance of $1.5 \times 10^{-3}/° C.$ or less. However, it will be noted that the temperature coefficient of resistance of the entire measuring system can readily be minimized by use of a suitable compensation circuit even when the alloy having a temperature coefficient of resistance of approximately $1.5 \times 10^{-3}/° C.$ is used. Moreover, the relation $$\left(\frac{\Delta R}{R}\right)_t = (\alpha_s - \alpha_f) GF \Delta T + C_t \Delta T = 0$$

can be satisfied by employing a suitable resilient material conforming to the gauge constants including the coefficient of expansion, $\alpha_f$, temperature coefficient of resistance, $C_f$, and gauge factor GF. In this relation $\alpha_s$ represents the coefficient of expansion of the resilient material.

In addition, the alloys usable in the present invention, being based upon noble metals, are highly resistant to oxidation as well as to corrosion, and readily solderable. Also, the secular change of these alloys can be satisfactorily reduced by taking into account their heat treatment, as with the case of other metal materials.

Table 3 illustrates variations in temperature coefficient of resistance of the alloys after they have been assembled as a strain gauge. As noted from the table, the variation is of the order of 0.2%, which is extremely small when compared with that of conventional strain gauges employing Cu-Ni alloys and forms one of the important advantages of the present invention.

To summarize the advantageous characteristics of the strain gauge of the present invention over conventional strain gauges:

(1) The gauge factor is much higher.
(2) The temperature coefficient of resistance is relatively small.
(3) It can be manufactured with high efficiency since variation in quality of the product is very limited within the same lot or between lots of material when compared with strain gauges of conventional make.
(4) The resistance to oxidation and to corrosion is excellent.
(5) It is readily solderable.
(6) High workability of the alloy makes it possible to work it into fine filament or foil with ease.
(7) The specific resistance has a proper value.
(8) The thermal electromotive force relative to copper is limited.
(9) The considerably high tensile strength and correspondingly high proportional limit makes it possible to measure extreme strains.

Because of these and other excellent characteristics, the strain gauge of the present invention has a wide range of application and thus is highly valuable in practice.

TABLE 3

| Composition (Atomic percent) | | | Test piece (No.) | Temperature Coefficient of resistance, $C_f$ ($\times 10^{-6}/° C.$) |
| --- | --- | --- | --- | --- |
| Pt | Rh | Pd | | |
| 33.5 | 14.3 | 52.2 | 1 | 657 |
|  |  |  | 2 | 657 |
|  |  |  | 3 | 657 |
| 10.0 | 50.0 | 40.0 | 1 | 556 |
|  |  |  | 2 | 557 |

What is claimed is:

1. An electrical resistance strain gauge adapted to be attached to a body for measuring a strain applied to the gauge from the body, said strain gauge having as the measuring element thereof an alloy consisting essentially of about 20.0–52.2 atomic percent platinum, about 11.3–33.5 atomic percent rhodium and about 14.3–50.0 atomic percent palladium, said alloy exhibiting a thermal electromotive force relative to copper of about $+2$ $\mu v./° C.$ to $-2$ $\mu v./° C.$ and having a temperature coefficient of resistance not greater than $1.5 \times 10^{-3}/° C.$ 2. An electrical resistance strain gauge of claim 1 wherein said measuring element is wire.

3. An electrical resistance strain gauge of claim 1 wherein said measuring element is a foil.

4. A method for measuring a strain by means of an electrical resistance strain gauge adapted to be attached to a body for measuring a strain applied to the gauge from the body which comprises detecting said strain with a measuring element composed of an alloy consisting essentially of about 20.0–52.2 atomic percent platinum, about 11.3–33.5 atomic percent rhodium and about 14.3–50.5 atomic percent palladium, said alloy exhibiting a thermal electromotive force relative to copper of about $+2$ $\mu v./° C.$ to $-2$ $\mu v./° C.$ and having a temperature coefficient of resistance not greater than $1.5 \times 10^{-3}$.

5. An electrical resistance strain gauge of claim 4 wherein said measuring element is wire.

6. An electrical resistance strain gauge of claim 4 wherein said measuring element is a foil.

References Cited

UNITED STATES PATENTS 2,166,055   7/1939   Jahn _____ 75—172
2,920,298   1/1960   Hines _____ 338—3

OTHER REFERENCES

Metals Handbooks, ASM, 8th edition, 1961, page 1191.
Strain Gage Techniques, U.C.L.A., 1958, pages 3–15.

HYLAND BIZOT, *Primary Examiner.*

DAVID L. RECK, *Examiner.*

H. F. SAITO, *Assistant Examiner.*